Aug. 21, 1956  J. W. JACOBS  2,759,581

AUTOMATIC CLUTCH-MANUALLY CONTROLLED

Filed July 2, 1953  2 Sheets-Sheet 1

INVENTOR.
James W. Jacobs
BY
His Attorney

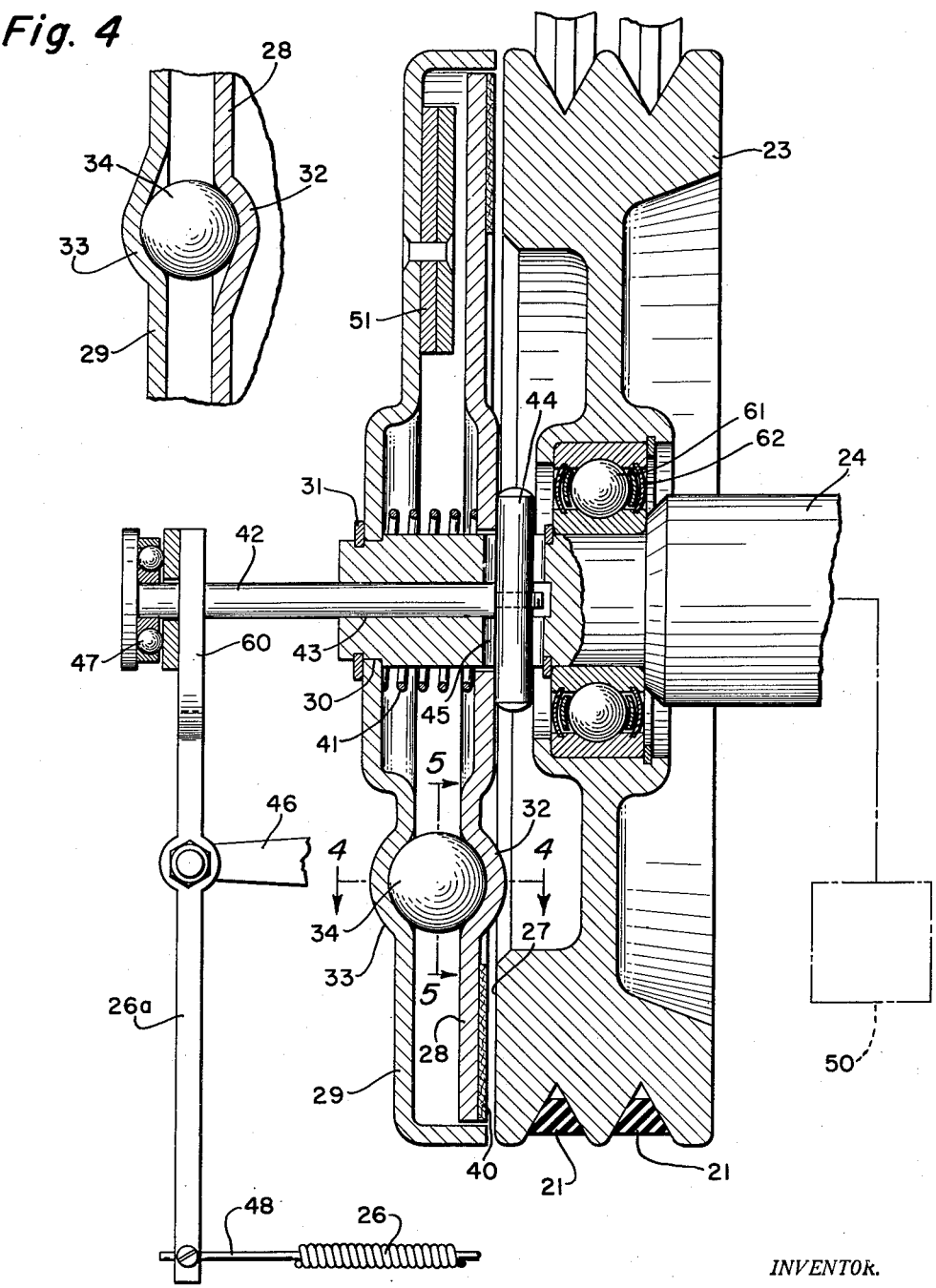

United States Patent Office 2,759,581
Patented Aug. 21, 1956

2,759,581

AUTOMATIC CLUTCH—MANUALLY CONTROLLED

James W. Jacobs, Dayton, Ohio, assignor to General Motors Corporation, Detroit, Mich., a corporation of Delaware Application July 2, 1953, Serial No. 365,591

2 Claims. (Cl. 192—32)

This application relates to refrigerating apparatus, and more particularly to an easily manipulated clutch for connecting and disconnecting the compressor and the engine of an automobile to turn the air conditioning system on and off, as desired by the user.

An object of this invention is to provide a clutch having a driven shaft, a driving member rotatable about and on the same axis as said driven shaft, said driving member having an axially directed drive surface together with a clutch disk and a spread reaction disk, the two disks having a self-energizing spreader means to engage and disengage the clutch upon actuation by the Bowden wire to provide a quickly engageable and disengageable belt drive between the automobile engine and the compressor.

Further objects and advantages of the present invention will be apparent from the following description, reference being had to the accompanying drawings wherein a preferred form of the invention is clearly shown.

In the drawings:

Figure 3 is a further enlarged cross-section taken along the line 3—3 of Figure 2.

Figure 4 is a cross-section taken along the line 4—4 of Figure 3.

Figure 1:
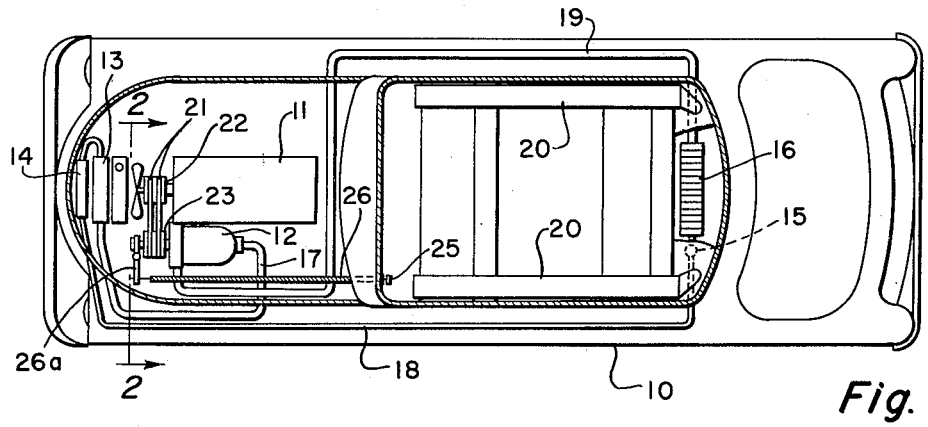
Figure 1 is a diagrammatic representation of an automobile provided with my invention.
Figure 2:
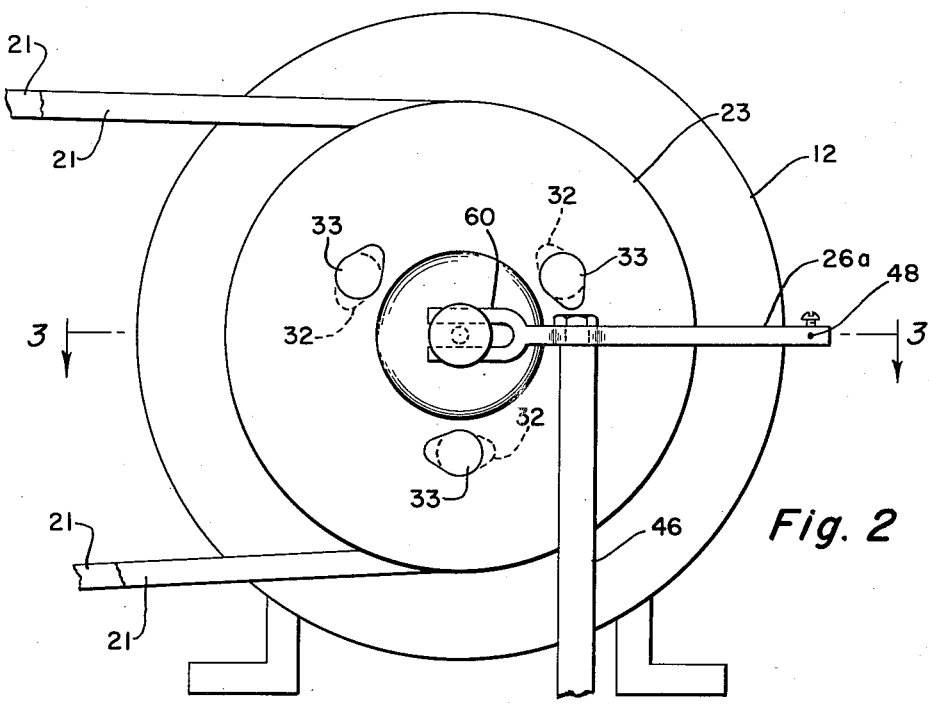
Figure 2 is an enlarged front view taken substantially along the line 2—2 of Figure 1.
Figure 5:
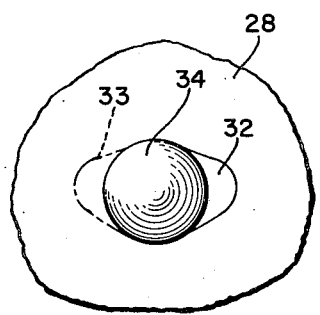
Figure 5 is a cross-section taken along the line 5—5 of Figure 3.

The automobile 10 has an engine 11, an air conditioning system including a compressor 12, condenser 13, receiver 14, expansion valve 15, and evaporator 16. The compressor 12 discharges through the line 17 to the condenser 13 and receiver 14. The liquefied refrigerant flows through the refrigerant liquid line 18 to the expansion valve 15 and evaporator 16. The refrigerant gas returns through the line 19 to the compressor 12. A blower, not shown, blows air past the evaporator 16 to the distributing duct system 20 within the car compartment.

The compressor 12 is driven from the engine 11 by belts 21 extending from the usual radiator fan pulley 22 to a clutch driving member or pulley 23. A clutch connects the driving member 23 with the driven shaft 24 of the compressor. The clutch is engaged and disengaged by pulling or pushing the knob 25 of the Bowden wire construction 26, which operates the lever 26a to engage and disengage the compressor as more fully hereinafter described. The driving member 23 is rotatable about and on the same axis as the driven shaft 24. The driving member 23 has an axially directed drive surface 27. A clutch disk 28 is rotatable about and longitudinally movable on the driven shaft 24 and is engageable with the drive surface 27. A spread reaction disk 29 is rotatably keyed at 30 with respect to said driven shaft 24 and is longitudinally fixed on the shaft 24 by the locking ring 31. Spreader and relative rotation locking means between the disks 28 and 29 is energized by a small initial relative rotation of the disks. The two disks then are locked against further rotation, so that the driving force from drive surface 27 is transmitted through both disks 28 and 29 to the keyed portion 30 of the driven shaft 24. The spreader means preferably takes the form of cam grooves 32 and 33 on adjacent faces of the disks. Balls 34 are placed in said grooves and cooperate with said grooves upon a small initial relative rotation of the disks to cam the disks apart and to lock them against further rotation. This spreading action causes the disk 28, and its friction surface 40, to be tightly pressed against the drive surface 27 because the disk 29 is longitudinally fixed.

The clutch disk 28 is spring pressed towards the drive member 23 by the spring 41. A longitudinal actuator 42 pulls the disk 28 away from surface 27, or allows it to be pushed against such surface by the spring 41. To this end, the pin or actuator 42 is journaled at 43 in the end of the driven shaft 24 and has a cross member or pin 44 which extends through the transverse slot 45 in the driven shaft 24 and engages the disk 28. Any forward pulling movement of the pin 42 causes the cross member 44 to pull the disk 28 forward away from the surface 27.

The actuator 42 is moved longitudinally by means of the lever 26a, which is fulcrumed on a support 46 carried by the engine. A ball-race 47 provides a suitable joint between the lever 26a and the actuator 42. The lever 26a is attached to the wire 48 of the Bowden wire construction 26, which wire is connected to the knob 25 on the dashboard of the car.

If desired, the clutch may include a counterbalancing weight for any unbalanced weight in the compressor. For example, if there is such an unbalanced weight, diagrammatically indicated at 50, within the compressor 11, then a counterbalancing weight 51 may be attached to the disk 29, and this may be sufficient statically to counterbalance the weight 50.

Preferably the driving member or pulley 23 is rotatable about and has a bearing on the driven shaft 24. This may include a ball-race construction 61 which is provided with grease sealing means 62 as is well known. The pulley 23 is axially fixed with respect to the shaft 24 by the ball-race.

In operation of my invention, it is assumed that the clutch is in the non-driving condition shown in Figure 3. When the user desires to make the air conditioning system effecitve, the knob 25 is pushed in towards the front of the car, and this moves the end 60 of the lever 26a towards the right in Figure 3 allowing the spring 41 to move the disk 28, with its friction surface 40, into slight engagement with the drive surface 27. A small initial relative rotation is caused between the disks 28 and 29. This small initial relative rotation causes the groove and ball construction to produce a spreading action between the disks 28 and 29, which reacts against the locking ring 31 and thus increases the pressure between the friction surface 40 and the drive surface 27. At the same time, the groove and ball construction locks the disks 28 and 29 against further rotation, so that the rotation of the surface 27 is transmitted at 30 to the driven shaft 24 and thence to the compressor. This starts the compressor in operation, and provides the desired air conditioning with the car body. Should the user desire to discontinue the air conditioning, he merely pulls the knob 25 towards him, which, in turn, moves the pin 42 towards the left in Figure 3 and disengages the disk 28 from the drive member 27, which stops the compressor.

When the compressor is stationary, all of the compressor parts, and the disks 28 and 29, actuator 42, etc. remain in a stationary, or non-rotating condition. This avoids wear on these parts during this time.

When the knob 25 is pushed in to connect the compressor 12 with the internal combustion engine 11, the end 60 of the lever 27 can move into complete disengagement with the ball-race 47 whose backward movement is stopped when the friction surface 40 engages the drive surface 27. This prevents wear between the lever 26a and the ball-race 47.

While the form of embodiment of the invention as herein disclosed constitutes a preferred form, it is to be understood that other forms might be adopted as may come within the scope of the claims which follow.

What is claimed is as follows:

1. A clutch comprising: a driven shaft; a driving member rotatable about and on the same axis as said driven shaft, said driving member having an axially directed and axially fixed drive surface; a clutch disk longitudinally movable on said driven shaft and having one side engageable with said drive surface; a spread reaction disk on the other side of said clutch disk rotatably and axially fixed with respect to said driven shaft and coaxial with said clutch disk and rotatable relatively thereto and having a limit of spread relatively to said clutch disk; a coaxial compression spring surrounding said driven shaft and tending to spread said disks apart; spreader means between said disks energized by relative rotation of said disks; and a longitudinal actuator moving said clutch disk out of contact with said axially fixed drive surface in one position and including a pin journaled in the end of said driven shaft and having a cross member in a transverse slot in said driven shaft and engaging said clutch disk to move said clutch disc against the action of said spring.

2. In combination, a compressor having a main drive shaft projecting therefrom, a drive pulley, means for supporting said pulley on said drive shaft for free rotation relative to said drive shaft, said drive pulley having an axially directed and axially fixed drive surface, a stamped sheet metal clutch disk longitudinally movable on said drive shaft and having one side engageable with said drive surface; a stamped sheet metal spread reaction disc on the other side of said clutch disk rotatably and axially fixed with respect to said drive shaft and coaxial with said clutch disc and rotatable relative thereto and having a limit of spread relative to said clutch disk; each of said sheet metal disks having cam grooves formed in the adjacent faces thereof; spreader means supported in said cam grooves between said plates and held in place solely by the walls of said cam grooves, and means for actuating said clutch disk out of contact with said axially fixed drive surface in one position and moving said clutch disk into contact with said axially fixed drive surface in another position to cause initial relative rotation between said disks, said last named means including a spring means for biasing said clutch disk into one of said positions, and means for moving said clutch disk into another of said positions.

References Cited in the file of this patent

UNITED STATES PATENTS

| | | |
|---|---|---|
| 936,190 | Tuckfield | Oct. 5, 1909 |
| 1,288,693 | Scharem | Dec. 24, 1918 |
| 1,882,805 | Gillett | Oct. 18, 1932 |
| 2,086,954 | Fawick | July 13, 1937 |
| 2,230,520 | Wemp | Feb. 4, 1941 |
| 2,392,572 | Briggs et al. | Jan. 8, 1946 |
| 2,491,003 | Elmore | Dec. 13, 1949 |

FOREIGN PATENTS

| | | |
|---|---|---|
| 826,391 | Germany | Jan. 3, 1952 |